United States Patent
Kennard et al.

Patent Number: 5,470,656
Date of Patent: Nov. 28, 1995

[54] MOISTURE-STABLE FLEXIBLE STRUCTURAL ADHESIVE STRAND

[75] Inventors: Jeffrey L. Kennard, Hockessin; George K. Kodokian; Peter Popper, both of Wilmington; Kalika R. Samant, Seaford, all of Del.

[73] Assignee: E. I. Du Pont de Nemours and Company, Wilmington, Del.

[21] Appl. No.: 270,861

[22] Filed: Jul. 5, 1994

[51] Int. Cl.[6] ............................................. D02G 3/00
[52] U.S. Cl. ........................... 428/370; 428/373; 428/374
[58] Field of Search ................................. 428/370, 373, 428/374, 74

[56] References Cited

U.S. PATENT DOCUMENTS

| | | | |
|---|---|---|---|
| 2,667,891 | 2/1954 | Hilldale | 137/470 |
| 2,867,891 | 1/1959 | Horton et al. | |
| 3,993,726 | 11/1976 | Moyer | 264/174 |
| 4,265,981 | 5/1981 | Campbell | 428/373 |
| 4,707,399 | 11/1987 | Rambosek | 428/370 |
| 4,770,915 | 9/1988 | Nakagawa et al. | 428/74 |
| 4,921,756 | 5/1990 | Tolbert et al. | 428/373 |
| 4,927,698 | 5/1990 | Jaco et al. | 428/373 |
| 5,068,142 | 11/1991 | Nose et al. | 428/232 |
| 5,076,872 | 12/1991 | Nakagawa et al. | 156/166 |
| 5,137,781 | 8/1992 | Lahijani et al. | 428/373 |
| 5,206,085 | 4/1993 | Nakagawa et al. | 428/372 |

*Primary Examiner*—N. Edwards

[57] ABSTRACT

This invention is a moisture-stable, flexible, structural adhesive strand which is suitable for use in the manufacture of an elongated pile article. The strand of this invention is comprised of a core of reinforcing multifilaments and a sheath of moisture-sensitive thermoplastic resin. The cross-sectional area ratio of reinforcing filaments to thermoplastic resin is in the range of about 0.04 to less than 0.3.

5 Claims, 4 Drawing Sheets

MOISTURE-STABLE FLEXIBLE STRUCTURAL ADHESIVE STRAND

FILED OF THE INVENTION

This invention relates to a flexible, thermoplastic structural adhesive material that contains a large proportion of a moisture-sensitive resin and a small proportion of moisture-insensitive reinforcing filaments, such as, but not limited to, glass, carbon or ceramic filaments, and which is useful for fusion bonding to other thermoplastic materials.

BACKGROUND OF THE INVENTION

Known composite materials include fiberglass continuous tows that are thoroughly impregnated with thermoplastic resins. The resulting composite typically has a cross-sectional area ratio of glass to resin of 0.50 or more. The composite is high in strength and low in elongation, but poor in flexibility so that it sometimes has problems with handling and post-processing.

Resin coated fiberglass strands are known for making scrim useful, for instance, for window screens. They have a large proportion of glass fibers and a small proportion of resin that coats the periphery of the glass fiber bundle. When combined with a large volume percentage of glass, resin/glass composites are stable under a variety of moisture and temperature conditions encountered during normal seasonal weather conditions.

There are also certain thermoplastic resins, such as polypropylene, that are inherently stable under a variety of moisture conditions, but which are not always preferred for wear, strength, aesthetic, or other reasons. Other thermoplastic resins, such as polyimides and polyamides, are dimensionally sensitive to moisture and temperature, with moisture sensitivity predominating. Nylon is one such resin that may absorb up to about 8.5% moisture and undergo significant dimensional changes from maximum expansion to maximum shrinkage of 3% or more. It has been found in the case of a nylon/fiberglass composite strand material, with a large proportion of nylon, that poor dimensional stability may occur when the strand expands at high humidity and shrinks at low humidity. Temperature affects the amount of expansion or shrinkage for a given humidity condition.

There is a need for a strand material that can be made using a high proportion of moisture sensitive resin, preferably nylon, that is stable when exposed to extremes of moisture and temperature periodically encountered in the environment, such as low humidity at both high and low temperatures, and high humidity at both high and low temperatures.

There is a need for a stable, flexible strand that can be used as an adhesive and structural component in a composite assembly, such as a carpet assembly, which incorporates an elongated pile article made from a strand as described in copending U.S. patent application Ser. No. 08/017,162, filed Feb. 22, 1993 by the assignee of the present invention, the disclosure of which is hereby incorporated by reference. In such a use, the strand must have a large proportion of resin (nylon) for it to be ultrasonically bondable with the preferred nylon carpet yarn. When incorporated in a carpet assembly, which may also use the ultrasonic bonding techniques, the coating of the resin must remain around the reinforcing filaments to protect the filaments, and the strand must be flexible and strong during processing and assembly into the carpet. The strand must also resist moisture and thermal expansion forces developed in the nylon of the strand so buckling will not occur in the carpet assembly under normal conditions of temperature and humidity changes.

SUMMARY OF THE INVENTION

The invention is a moisture-stable, flexible, structural adhesive strand comprising a core of reinforcing filaments and a sheath of a moisture-sensitive thermoplastic resin which is adhered to the periphery of the core. The reinforcing filaments in the interior portion of the core are substantially free of the moisture-sensitive thermoplastic resin so that these filaments are free to move, relative to the sheath, in order to maintain the flexibility of the strand. The strand has a cross-sectional area ratio of reinforcing filaments to resin in the range of about 0.04 to less than 0.30. This ratio is critical in order to provide the strand with the required strength, adhesive properties and dimensional stability for use of this strand as a structural adhesive in rug and carpet products. The length of strands having this cross-sectional area ratio changes by less than 2 percent as the relative humidity is varied in the range of 0 to 100% and the temperature is varied in the range of 5 to 40° C.

DETAIL DESCRIPTION OF THE INVENTION

Figure 1:
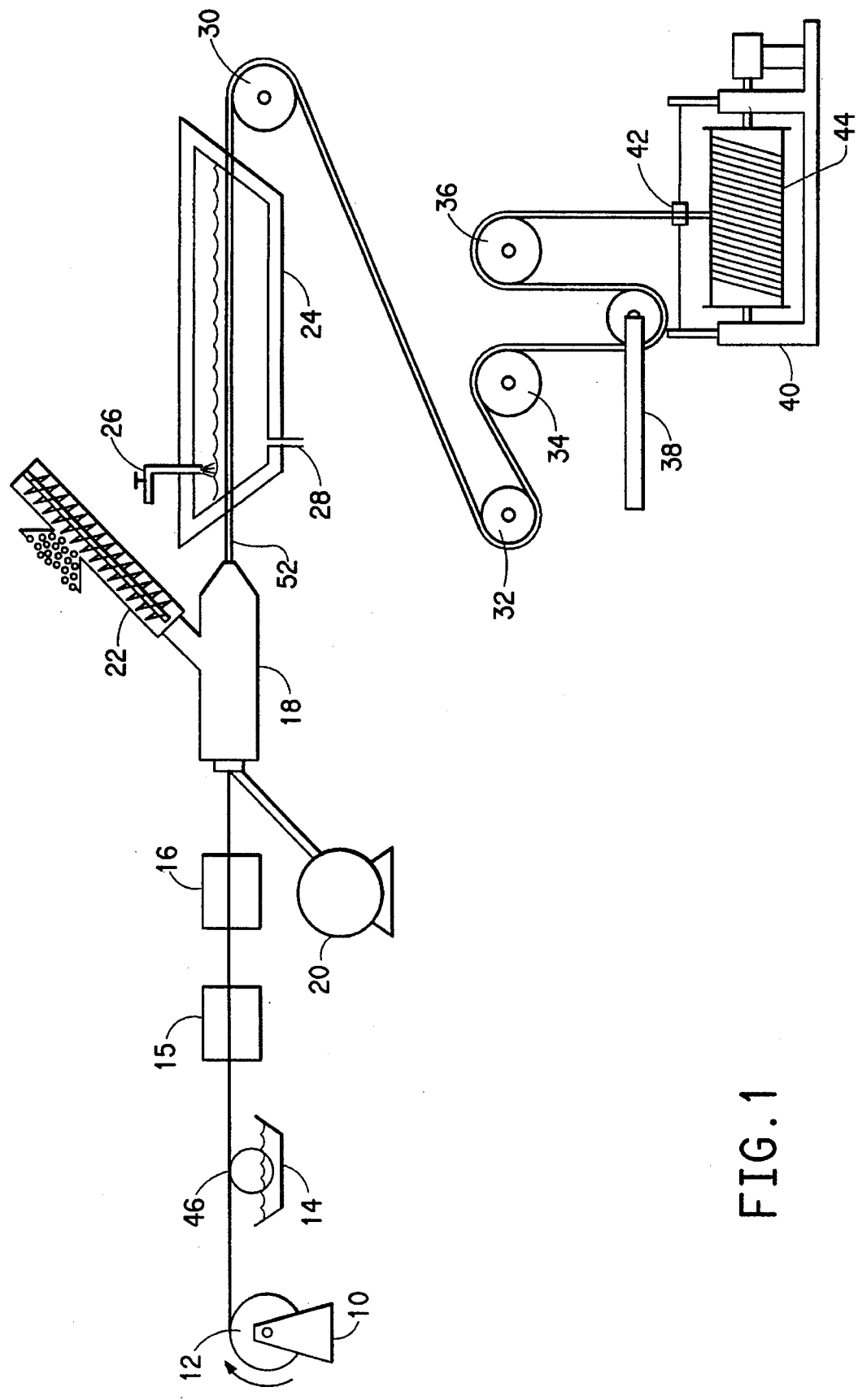
FIG. 1 is a schematic diagram of a system for making a reinforced resin strand of this invention.

FIG. 1 is a schematic diagram of a system for coating a bundle of reinforcing filaments with a thermoplastic resin sleeve to make the strand of this invention. The system basically comprises an unwind stand 10, a package 12 of reinforcing filaments, a coating device 14, a drying (or heating) device 15, a tensioner 16, a crosshead die 18, a vacuum pump 20, an extruder 22, a water quench tank 24 with a source of water 26 and drain 28, various guide rolls 30 and 36, drive rolls 32 and 34, a winder dancer 38, a winder 40 with traverse 42, and a package 44. A bundle of reinforcing filaments 46 is unwound with a rolling take-off from package 12 to minimize twist in the strand. The bundle may be pretreated with a coating on all the filaments to aid in handling the bundle with low friction and to bind the filaments into a coherent bundle, or a coating may be added by coating device 14 and dried by drying device 15. Obviously, if the strand is coated and dried in a pretreating step off-line, devices 14 and 15 may not be needed. The coating may also serve to assist in forming a bond between the bundle of reinforcing filaments and the resin sleeve. Typical coatings may be a starch and oil coating, a silane coating, an acrylic coating, or the like.

Figure 2A:
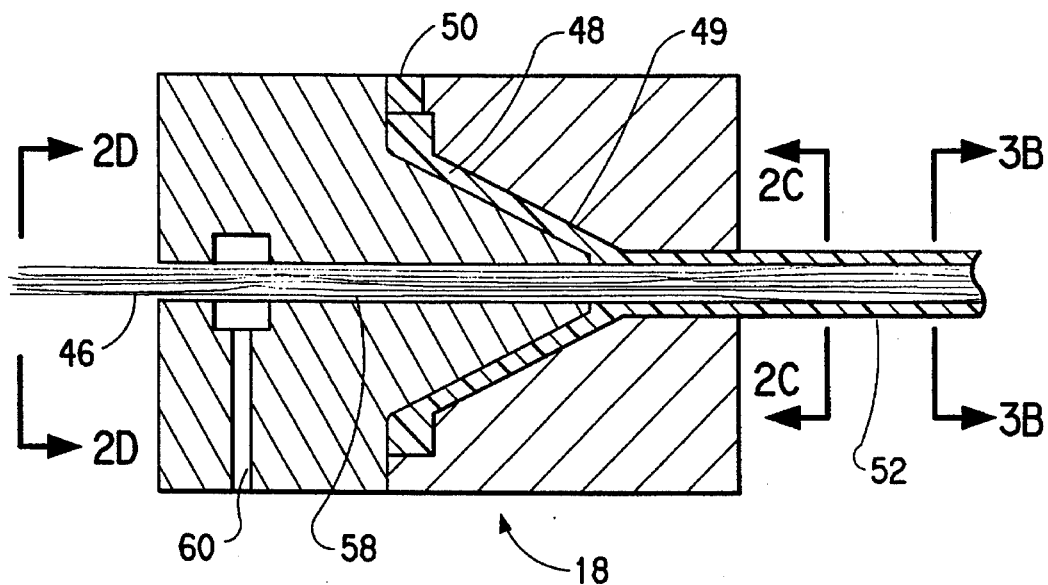
FIGS. 2A–2D show details of the die suitable to make the strands of this invention.
Figure 2B:
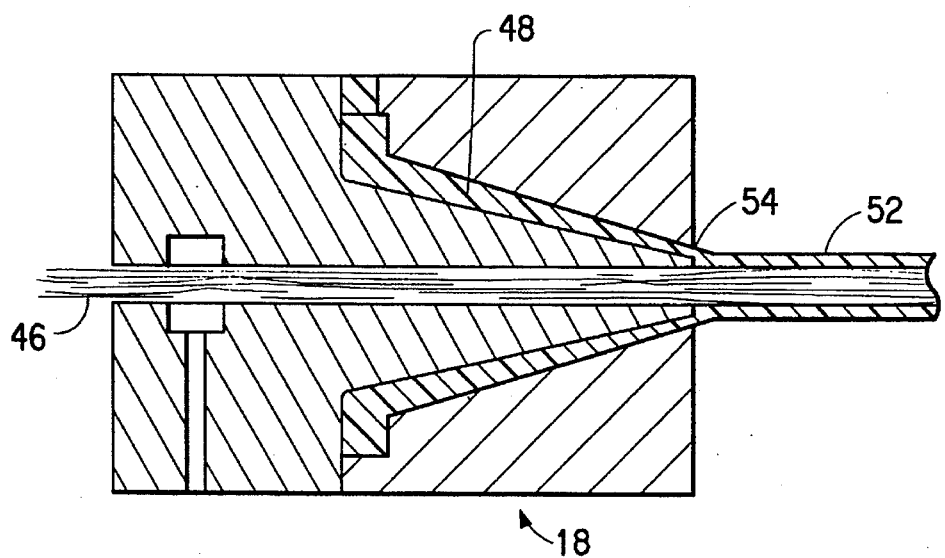
Figure 2C:
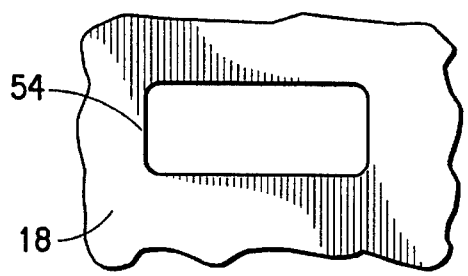
Figure 2D:
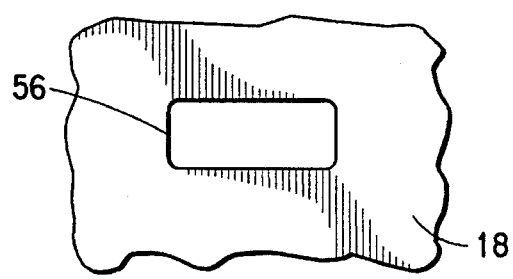

The treated reinforcing filaments pass through a tensioner 16 that puts a low tension of about 5–10 grams on the filament bundle as it enters crosshead die 18, pulled by drive rolls 32 and 34. Extruder 22 forces molten resin into crosshead die 18 and into an annular passage surrounding the filament bundle. Two different crosshead die arrangements that are known to work are shown in FIGS. 2A and 2B. FIG. 2A shows a "compression die" where the molten resin 48 entering at port 50 connected to extruder 22 passes through annular passage 49 and meets the filament bundle 46 inside the die 18. The combined filament/resin strand 52 exits the die 18 at outlet 54 which has an elongated shape like that shown in FIG. 2C (which is view 2C—2C of FIG. 2A). The filament bundle enters the crosshead die at entrance 56 and goes through a passage 58. Both the entrance and the passage may have an elongated shape like that shown in FIG. 2D (which is view 2D—2D of FIG. 2A). The filament bundle is a close fit without binding in the entrance and passage so it can be accurately guided relative to the annulus of molten resin. Intersecting passage 58 is a conduit 60 that is connected to vacuum pump 20. The vacuum draws any air from the filament bundle and from within the die so that the molten resin is drawn tightly around the filament bundle. The resin coating adheres to the periphery of the bundle of reinforcing filaments without significant impregnation of the resin into the interior of the bundle so that the composite structure remains flexible for further processing and use. The resin coating may be adhesively attached to the entire periphery of the filament bundle or there may be regions where the resin is simply mechanically engaged with the filaments at the periphery of the bundle.

FIG. 2B shows another crosshead die arrangement referred to as a "coating die" where the molten resin 48 meets the glass bundle 46 at or near the exit 54 of the die 18 to form strand 52. For some operating conditions this arrangement may be preferred over that shown in FIG. 2A.

The strand 52 after leaving the die 18 is still hot and must be quenched to preserve the shape imparted by the die exit 54. A conventional quench tank 24 can be used. Optionally, a set of shaping rolls (not shown) may be used to shape the hot strand after it emerges from the die, prior to feeding it to quench tank 24. After leaving the tank, the strand can be contacted by guide roll 30 and drive rolls 32 and 34 without deforming the shape of the strand.

For a given filament bundle and die, the amount of resin on the strand can be varied by conventional means. These may include varying extruder pressure, temperature, screw speed, line speed, and the like.

The reinforcing filaments useful in this invention are substantially insensitive to moisture (i.e. the filament's length is substantially unchanged due to changes in humidity) and the filaments have less than 0.20% water pick-up. The reinforcing filaments should have a modulus per unit density of at least five times that of the thermoplastic resin used to make the strand. Preferably, the reinforcing multifilaments are of glass, ceramic fiber or carbon fiber. The carbon fibers may be pitch-derived carbon fibers obtained from petroleum or coal tar pitch, or PAN-type carbon fibers obtained from acrylic fibers. The glass may be continuous strand-type or staple-type. Continuous-type glass is preferred. The ceramic fibers may be SiC fibers, SiN fibers, BN fibers or alumina fibers. Organic polymeric filaments having the required moisture stability and modulus/density may also be used.

The thermoplastic resin suitable for use in this invention is moisture sensitive, meaning it expands and contracts with changes in humidity. Preferably, the resin is a polyimide or a polyamide. More preferably, the resin is nylon 6,6 or nylon 6. Nylon 6,6 is especially preferred. Recycled consumer or industrial waste versions of these resins also work, and may make the product easier to process and less expensive.

The cross-sectional area ratio of reinforcing filaments to resin is important to ensure the strand is axially stable under a variety of temperature and humidity conditions so there is no change of axial dimension, or strain, of the strand occurring that exceeds 2% for application such as in area rugs (which have freedom to move without buckling), or preferably 1% for applications such as in wall-to-wall carpets (which are secured to the floor at their edges and thus have little freedom to move), or more preferably 0.5%. With an axial dimensional change of less than 1%, no buckles should develop in a nylon carpet made with an elongated pile article using the strand of the invention made from nylon resin. When considering fiberglass and nylon 6 or nylon 6,6 as the major constituents of the strand, the ratio of glass to nylon can be expressed as a ratio of cross-sectional areas of the glass and nylon in the strand. It has been found that the preferred cross-sectional area ratio of fiberglass to nylon is in the range of about 0.04 to less than 0.30, and most preferred is the range about 0.1 to less than 0.30. This range would be approximately the same for other reinforcing filament/resin combinations. Reinforcing filaments having a tenacity greater than that of fiberglass may produce a strand with an acceptable length change of 2% or less with a cross-sectional area ratio of filaments to resin of less than 0.04. The converse may be true for filaments having a tenacity less than that of fiberglass. Similarly resins having a lower dimensional response to moisture than nylon may produce suitable strands with less than 0.04 cross-sectional area ratio of filaments to resin.

The useful range of cross-sectional area ratios is determined from consideration of the maximum strength required of the strand, the thickness of the nylon required for ultrasonically bonding (or other bonding means such as thermal) the tufts to the strand to form the elongated pile article, and the moisture response of the nylon sleeve in the strand. In the example of the strand being used in an elongated pile article making up a carpet, it has been found that the tensile strength required for such a strand is about 8–15 lbs, and preferably about 10–12 lbs. Using a lower cross-sectional area ratio than about 0.04 would give the strand poor dimensional stability to changes in humidity and temperature. The strength of the strand might also be less than the minimum 8 lbs. Using a filament to resin cross-sectional area ratio greater than about 0.29 will cause the strand to be a poor adhesive for carpet system applications and will adversely affect its flexibility. Also, since the desired strength and dimensional stability is achieved with lower ratios, increasing the ratio above 0.29 will add cost due to the additional reinforcing fiber, without any benefit in performance.

Figure 3A:
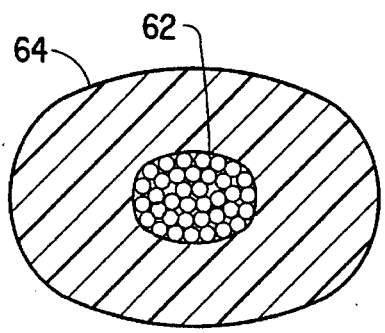
FIGS. 3A–3C show some typical cross-sections through the strand of this invention.
Figure 3B:
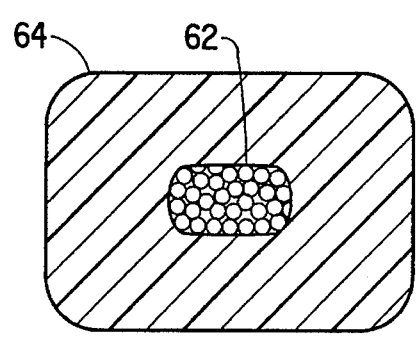
Figure 3C:
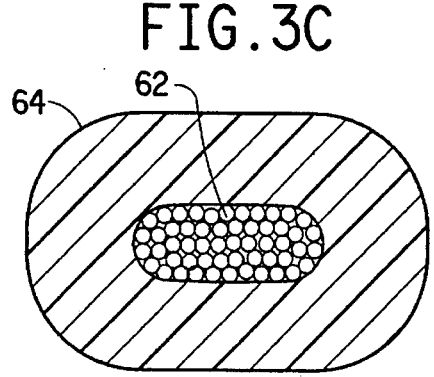

The strand of this invention may have a round or an oblong-shaped cross-section and has good uniformity along its length. The strand shape is preferably compatible with the needs of the strand when it is to be used in the aforementioned carpet system. For instance, for processing in a carpet system, the strand should preferably bend easily 180° over small wheels (radii approximately six times the thickness of the strand) without leaving a residual bend in the strand or weakening it. The strand should preferably be a shape that can be accurately guided along the edges under an ultrasonic horn, and it should be a shape that can be easily restrained from rotation or twist. It has been determined that such a shape is preferably an oblong-shaped or elliptical-shaped cross-section having a particular height to width ratio. Preferably the ratio is from 0.5 to 0.8. Preferably, the height is at least 18–22 mils to provide sufficient thickness for reliable edge guiding under an ultrasonic horn. Preferably, the width is not excessive which would space apart the pile and expose the strand when used in an elongated pile article, and would waste material unnecessarily. Preferably, the width is between 28–34 mils. Preferably, the bundle of reinforcing filaments is centrally located in the resin coating so sufficient resin is available all around the strand for fusion bonding, and the cross-sectional shape is very uniform along the length of the strand. FIG. 3A shows an elliptical shape having both the preferred cross-sectional area ratio of reinforcing filaments 62 to resin 64 and the preferred height to width ratio. FIG. 3B shows a rectangular shape with rounded corners that has the preferred ratios. FIG. 3C shows an oblong shape with the preferred ratios where the semicircular ends are connected by a rectangular central portion. These shapes may all be categorized by the term "oblong" shape. The shape of the bundle of reinforcing filaments may or may not reflect the shape of the strand. In some cases, the bundle may be flatter of rounder than the strand shape.

When the resin in the strand is drawn, it has been observed that the moisture response of the strand is greater in the direction of the draw. In the design of a stable strand, therefore, it is preferred that the resin be essentially undrawn to minimize the response to moisture.

EXAMPLE

The change in length of the strand is affected by moisture and temperature. A test was run to determine the dimensional changes that occur with changes in humidity and temperature that may be encountered in use. The samples were measured at 20° C. ambient temperature, 40° C. and 5° C. The samples were measured after submersion in water and after drying. The samples were held at a given condition for a period of at least 96 hours to ensure the sample had equilibrated with the condition. To decrease the need for accuracy and improve the ease of measuring dimensional change, some of the initial sample lengths were about 100 inches long, although some samples as short as 6 inches were also tested. The percent change in length relative to the starting length at 20° C./50% RH was recorded at the end of each condition period. The samples were submitted to the conditions of high and low humidity at high and low temperatures sequentially. In some cases, the samples were "pre-conditioned" to maximum and minimum moisture conditions before data were taken; in general, pre-conditioned samples and those not preconditioned performed similarly and the differences were not considered significant. In cases where different results were obtained for a sample submitted to slightly different conditions, the results were averaged.

Sample 1 (control) is an oblong cross-section of 2000 denier, drawn, nylon 6,6 strand of HYTEN® made by the DuPont Co. of Wilmington, Del.

Sample 2 (control) is a round cross-section 22 mils diameter strand of nylon 6,6 which has been drawn.

Sample 3 (control) is a round cross-section 22 mils diameter strand of nylon 6,6 which has a 20% by weight additive of novolac resin to resist moisture absorption. The strand has been drawn.

Samples 4–9 are strands of this invention made by the process shown in FIG. 1. Unless otherwise indicated, the "coating" dye shown in FIG. 2B was used and the line speed was 100 ft./min.

Sample 4 is an oblong cross-section of 19 mils by 36 mils with a 600 denier fiberglass bundle centrally located in a nylon 6,6 coating. The glass is treated with a starch and oil coating to aid in handling. The resin in the strand is undrawn.

Sample 5 is an oblong cross-section of 18 mils by 38 mils with a 300 denier fiberglass bundle centrally located in a nylon 6,6 coating. The glass is treated with a starch and oil coating to aid in handling. The resin in the strand is undrawn.

Sample 6 is an oblong cross-section of 21 mils by 35 mils with a 900 denier fiberglass bundle centrally located in a nylon 6,6 coating. The glass is treated with a starch and oil coating to aid in handling. The resin in the strand is undrawn. A "compression" dye, FIG. 2A, was used to make Sample 6. The line speed was 450 ft./min.

Sample 7 is an oblong cross-section of 18 mils by 38 mils with a 900 denier fiberglass strand centrally located in a nylon 6,6 coating. The glass is treated with a starch and oil coating to aid in handling. The resin in the strand is undrawn.

Sample 8 is an oblong cross-section of 13 mils by 47 mils with a 1500 denier fiberglass strand centrally located in a nylon 6,6 coating. The glass is treated with a silane coating to aid in handling and improve the adhesion with the nylon. The resin in the strand is undrawn.

Sample 9 is an oblong cross-section of 16 mils by 32 mils with a 900 denier fiberglass strand centrally located in a nylon 6,6 coating. The glass is treated with a silane coating to aid in handling and improve the adhesion with the nylon. The resin in the strand is undrawn.

Figure 4:
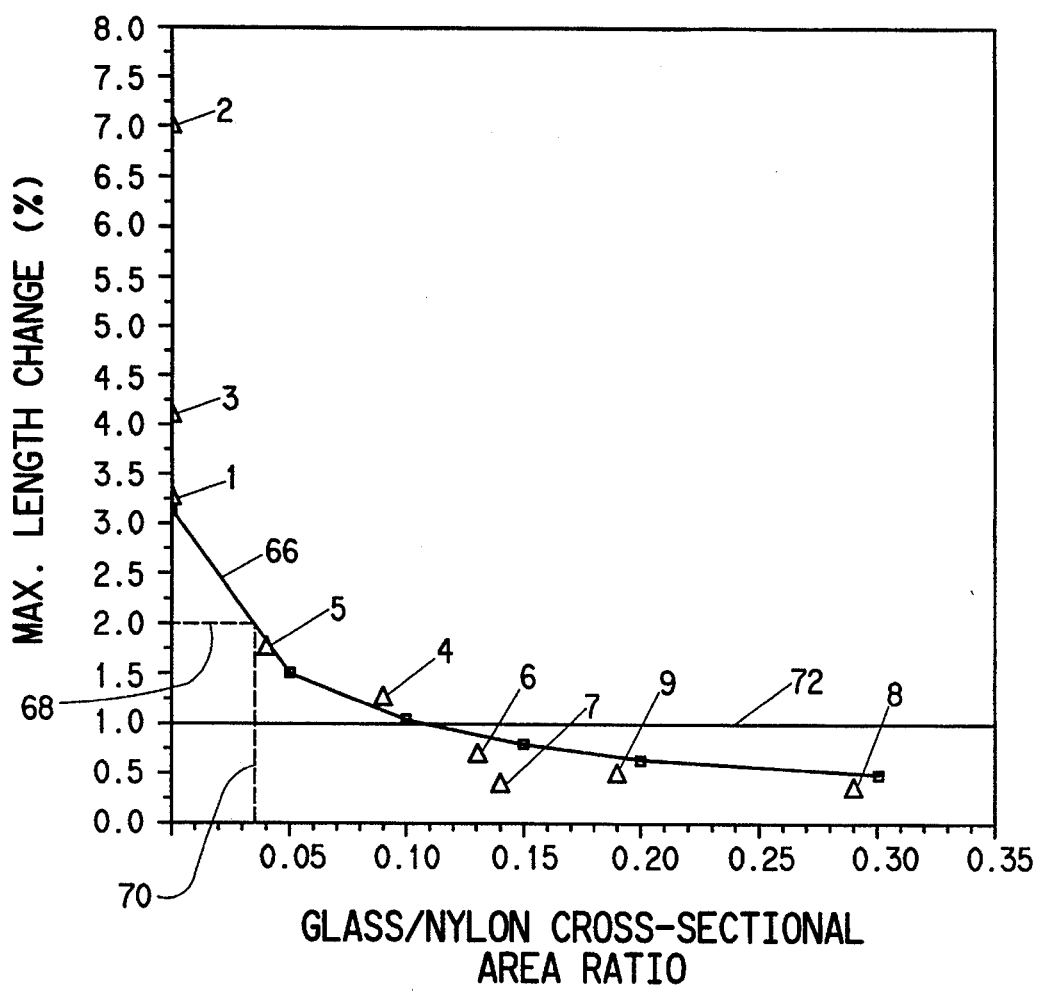
FIG. 4 is a graph showing the experimental and theoretical data for the maximum change in length response of several sample strands for different glass to nylon resin cross-sectional area ratios.

FIG. 4 shows a theoretical moisture response curve 66 that shows the relationship between the predicted maximum percent change in length of a sample due to a variety of humidity/temperature conditions and the glass/nylon cross-sectional area ratio of the samples. The theoretical curve is based on a melt joined strand where the nylon and glass are joined in a strain-free condition at a temperature of about 260° C. and about 0% RH. For a sample with a zero ratio, or no glass reinforcement, the maximum predicted percent length change is 3.1%. For a sample with a 0.3 glass/nylon cross-sectional area ratio, the maximum predicted percent length change is less than 0.5% and the curve has nearly flattened out. Noting the dashed lines 68 and 70, for a sample where it is desired to have a maximum percent length change of 2%, a glass/nylon cross-sectional area ratio of more than 0.03 is required. This curve can be used to help design a composite strand having a predictable moisture response.

The numbered data points in FIG. 4 correspond to the actual moisture response of the numbered samples. Note that there is reasonable agreement between the theoretical and experimental data. Samples which may be useful in an elongated pile article such as an area rug assembly are those that have less than a 2% maximum length change. Strands having a length change of 2% or less have a cross-sectional area ratio of glass to nylon of at least about 0.04. Those samples having 1% or less maximum length change are suitable for application in elongated pile articles in a wall-to-wall carpet assembly. Samples falling below the 1% line at 72 are samples 6, 7, 8, and 9. These samples have a cross-sectional area ratio of 0.1 or greater. Samples 6, 7, and 9 have 900 denier of glass that provides a tensile strength of about 8–15 lbs which is sufficient for application in a carpet structure. Sample 8 has a glass denier of 1500 that provides a tensile strength of about 12–25 lbs which is also sufficient for application in a carpet structure.

We claim:

1. A moisture-stable, flexible, structural adhesive strand comprising: a core consisting essentially of continuous moisture-insensitive reinforcing filaments, said core having a periphery and an interior portion; and a sheath of a moisture-sensitive, thermoplastic resin, said sheath surrounding said core and adhered to the periphery of said core so that reinforcing filaments at the interior portion of said core are movable relative to said sheath, said strand having a cross-sectional area ratio of reinforcing filaments to moisture-sensitive thermoplastic resin in the range of about 0.04 to less than 0.30 whereby said strand has a change in length response from maximum expansion to maximum shrinkage of less than 2.0%, relative to a starting length measured at 20° C., 50% RH, due to changes in temperature and humidity over a relative humidity range of 0–100% and a temperature range from 5° C. to 40° C.

2. The strand of claim 1 wherein said moisture-sensitive resin is nylon and said reinforcing filaments are selected from the group consisting of glass filaments, carbon filaments, and ceramic filaments.

3. The strand of claim 2 wherein said moisture-sensitive resin is nylon 66 and wherein said reinforcing filaments are glass.

4. The strand of claim 3 wherein said cross-sectional area ratio of reinforcing filaments to moisture-sensitive resin is in the range of about 0.10 to less than 0.30 whereby the change in length response from maximum expansion to maximum shrinkage due to changes in temperature and humidity over a relative humidity range of 0–100% and a temperature range from 5° C. to 40° C. is less than 1%, relative to a starting length measured at 20° C., 50% RH.

5. The strand of any one of claims 1–4 wherein said strand has an oblong shaped cross-section, said oblong shaped cross-section having a height to width ratio in the range of 0.5 to 0.8.

* * * * *